(12) United States Patent
Ariki

(10) Patent No.: US 7,810,763 B2
(45) Date of Patent: Oct. 12, 2010

(54) VEHICLE LAMP

(75) Inventor: Yuji Ariki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 323 days.

(21) Appl. No.: 12/014,319

(22) Filed: Jan. 15, 2008

(65) Prior Publication Data

US 2008/0219022 A1  Sep. 11, 2008

(30) Foreign Application Priority Data

Jan. 18, 2007  (JP) .............................. 2007-009496

(51) Int. Cl.
*F16L 3/08* (2006.01)
(52) U.S. Cl. ................................. 248/74.1
(58) Field of Classification Search ............ 248/68.1, 248/74.1, 74.5, 73, 65
See application file for complete search history.

(56) References Cited

U.S. PATENT DOCUMENTS 4,807,096 A * 2/1989 Skogler et al. .............. 362/142

5,275,367 A * 1/1994 Frye ........................ 248/205.3

FOREIGN PATENT DOCUMENTS

| JP | 1155835 | 6/1989 |
| JP | 2004273352 | 9/2004 |

* cited by examiner

*Primary Examiner*—J. Allen Shriver, II
*Assistant Examiner*—Erin Smith
(74) *Attorney, Agent, or Firm*—Kenealy Vaidya LLP

(57) ABSTRACT

A vehicle lamp can include a wiring harness, a wiring clip for fixing the wiring harness in the lamp, and a casing for fixing the wiring clip. A force needed for fixing the wiring clip to a rib in the casing can be adjustable. The wiring clip can include both a clip body including at least one wire holder and a spring clip that is located in the clip body. The wiring clip can hold a wiring harness between the at least one wire holder and an inner surface of the casing and at the same time can be affixed to the rib of the casing. The width of the rib can differ in accordance with a longitudinal position of the rib, and the rib can be inserted between a U-shaped spring of the spring clip. Thus, the vehicle lamp can provide for fixing the wiring clip to the rib of the casing while also holding the wiring harness using the wiring clip to firmly fix the wiring harness in the lamp.

21 Claims, 8 Drawing Sheets

VEHICLE LAMP

This application claims the priority benefit under 35 U.S.C. §119 of Japanese Patent Application No. 2007-009496 filed on Jan. 18, 2007, which is hereby incorporated in its entirety by reference.

BACKGROUND

1. Field

The presently disclosed subject matter relates to a vehicle lamp that includes a wiring harness, a wiring clip for fixing the wiring harness and a casing to which the wiring clip is affixed, and more particularly to a vehicle lamp further including a rib in the casing wherein a feature of the vehicle lamp includes adjustable force for fixing the wiring clip to the rib of the vehicle lamp casing.

2. Description of the Related Art

A vehicle vibrates due operation of the engine and will sometimes get a jolt or other road vibrations when the vehicle is moving. Therefore, a wiring harness in a vehicle may come away from a socket, etc., due to the engine or road vibrations and movements. For example, a connecter or the like may break in the middle thereof due to the vibration, jolt, shock, etc. Accordingly, a wiring clip for fixing the wiring harness is one of the important parts in a vehicle. Consequently, a conventional vehicle lamp including a wiring harness, a wiring clip having a holding function for fixing the wiring harness, and a casing to which the wiring clip is affixed is well known.

An exemplary embodiment of the conventional vehicle lamp including a wiring harness, a wiring clip, and a casing is disclosed in patent document No. 1 (Japanese Patent Application Laid Open 2004-273352). FIGS. 6A and B are diagrams depicting a conventional wiring clip disclosed in patent document No. 1, wherein FIG. 6(A) is a top view thereof and FIG. 6(B) is a front view thereof. The wiring clip 10 is composed of a zonal member 11 including screw holes 12 at both ends thereof. The zonal member 11 sandwiches a wiring harness 14 in an opening 13 formed by wrapping the zonal member 11 about the wiring harness 14 as shown in FIG. 6B. The wiring clip 10 holding the wiring harness 14 can be fixed to a casing of the vehicle lamp by a screw 15 inserted via the screw holes 12 and then attached to the vehicle lamp casing. Thus, the wiring harness 14 can be fixed to the casing of the vehicle lamp via the wiring clip 10.

In the above-described vehicle lamp, the conventional method for fixing the wiring harness 14 to the casing is assured, however, the method requires two processes, including both wrapping the wiring harness 14 with the wiring clip 10 and screwing the wiring clip 10 with the screw 15. In addition, it may be difficult to carry out both processes in such a small case as in the casing of a vehicle lamp, especially due to the trend in minimization of vehicle lamps.

Another exemplary embodiment of a conventional vehicle lamp including a wiring harness, wiring clip, and lamp casing is disclosed in patent document No. 2 (Japanese Patent Application Laid Open Hei11-55835). FIGS. 7A and B are diagrams depicting the conventional wiring clip disclosed in patent document No. 2, wherein FIG. 7(A) is a top view thereof and FIG. 7(B) is a front view thereof. The disclosed method for fixing a wiring harness to the casing in this conventional example does not require the process of using a screw and screw hole to secure the wiring clip to the lamp casing.

According to the conventional wiring clip disclosed in the vehicle lamp shown in FIGS. 7A and B, the wiring clip 20 is composed of both a clip body 21 that is made of resin and a spring clip 24 that is made of metal. The clip body 21 includes a wire holder 22 for holding a wiring harness 30 and hooks 23 for attaching the spring clip 24 to the clip body 21. The wiring harness 30 is attached to the wire holder 22 via a tape 31 or a wire, etc. The spring clip 24 is incorporated in the clip body 21 and is attached to the clip body 21 by the hooks 23. The spring clip 24 is U-shaped and includes two spring boards 24a at each of the U-shaped sides and each side including a locking click 24b on the two spring boards 24a. The two spring boards 24a constantly bias towards each inner side and to each other and move towards each outer side to each other by pressing each locking click 24b from a U-shaped top surface. Thus, a top surface between each locking click 24b is constantly closed. However, the top surface of the spring clip 24 opens when pressing strongly between each locking click 24b.

When the vehicle lamp is affixed to the wiring clip 20 that holds the wiring harness 30 with the wire holder 22 thereof, a rib in the casing of the vehicle lamp presses between each locking click 24b. Then, the top surface between each locking click 24b opens and the rib enters in the spring clip 24. Because the two spring boards 24a of the spring clip 24 are constantly biased towards each inner side to each other, the rib fixes between the two spring boards 24a and therefore the wiring clip 20 can be fixed to the rib in the casing of the vehicle lamp. Thus, the wiring clip 20 holding the wiring harness 30 can be affixed to the casing of the vehicle lamp without a process of screwing.

However, in the above-described wiring clip 20, the spring clip 24 is made of a metallic spring having a complex shape that is made by a flat spring. The spring clip 24 is also required to be incorporated in the clip body 21 which has a complex shape. Therefore, when the rib in the casing of the vehicle lamp is inserted between each locking click 24b of the clip 24, there is a possibility that a force of the elastic deformation between each locking click 24b greatly varies with respect to respective wiring clips 20.

In addition, the above-described wiring clip 20 is not required to screw to the casing of the vehicle lamp. However, the wiring clip 20 is required to wrap about the wiring harness 30 including the wire holder 22 using a tape, a wire, etc. Moreover, once the wiring harness 30 is held with the wire holder 22 of the wiring clip 20, an attachable range of the wiring clip 20 is limited to a movable distance of the wiring harness 30. Thus, a great deal of attention is required concerning the holding position of the wiring harness 30, especially with respect to a diameter of the wiring harness 30, a hardness, etc.

The above-referenced Patent Documents are listed below.

1. Patent document No. 1: Japanese Patent Application Laid Open 2004-273352

2. Patent document No. 2: Japanese Patent Application Laid Open Hei11-55835

The disclosed subject matter has been devised to consider the above and other problems, characteristics and features. Thus, an embodiment of the disclosed subject matter can include a vehicle lamp including a wiring harness, a wiring clip and a casing, wherein a feature of the vehicle lamp can include providing for an adjustable force for fixing the wiring clip to the casing of the lamp. The adjustable force can be determined according to an elastic intensity of the wiring clip, a diameter of the wiring harness, a hardness, a weight, etc. Furthermore, the vehicle lamp wiring clip does not require the above-described two processes of both wrapping the wiring harness with a wire holder of the wiring clip using tape or the like, and/or screwing the wiring clip to the casing with a screw, etc.

SUMMARY

The presently disclosed subject matter has been devised in view of the above and other characteristics, desires, and problems in the conventional art, and to make certain changes to existing vehicle lamps. Thus, an aspect of the disclosed subject matter includes providing a vehicle lamp including a wiring harness, a wiring clip for fixing the wiring harness and a casing (e.g., housing) for fixing the wiring clip, wherein the vehicle lamp can provide for an adjustable force for fixing the wiring clip to the casing. In addition the above-described processes of wrapping the wiring harness with a tape or the like for attachment with the wire holder of the wiring clip, and screwing the wiring clip to the casing of the lamp, may not be required.

According to an aspect of the disclosed subject matter, a vehicle lamp can include a wiring harness, a wiring clip for fixing the wiring harness and a casing. The wiring clip can include both a clip body including at least one wire holder and a spring clip including two locking clicks, the clip body having the spring clip inserted therein and holding a wiring harness via at least one wire holder. The casing can include a rib that is inserted or insertable in the spring clip between the two locking clicks, wherein a width of the rib differs in accordance with a longitudinal position of the rib.

In the above-described exemplary vehicle lamp, the wiring clip can fix the rib in the casing of the vehicle lamp by inserting the rib into the spring clip between the two locking clicks without requiring any screwing process. In addition, because the width of the rib differs in accordance with a longitudinal position of the rib, when inserting the rib into the spring clip in a position of the narrow width of the rib, the force fixing the wiring clip to the rib can be reduced. On the other hand, when inserting the rib into the spring clip in a position of the wide width of the rib, the force fixing the wiring clip to the rib can be extended or increased.

In this case, the width of the rib can also differ along a row/axis and according to the longitudinal position of the rib in the above-described exemplary vehicle lamp. Therefore, the force fixing the wiring clip to the rib can be finely adjusted in a continuous fashion.

In the above-described exemplary vehicle lamp, the wiring harness can be fixed by sandwiching it between a surface of the at least one wire holder and a surface of the casing and can be also sandwiched between both side surfaces of the at least one wire holder. Thus, the wiring harness can be fixed with the at least one wire holder without wrapping the wire harness with a tape or the like. In addition, because the wiring harness can be sandwiched between the both side surfaces of the at least one wire holder, when fixing the wiring clip to the rib in the casing of the vehicle lamp, the wiring clip can move while in a state holding the wiring harness between both side surfaces of the at least one wire holder.

In the immediately above-described exemplary vehicle lamp, a contacting surface between the wiring harness and the at least one wire holder can each be complementary in shape. In this case, a holding force between the wiring harness and the at least one wire holder can increase. Especially, each complementary shape can result in an advantage when a plurality of wiring harnesses is held with a plurality of wire holders.

Furthermore, the width of the rib can differ in accordance with a position in a direction towards a height of the rib and can also differ in a continuous fashion according to a position in a direction towards a height of the rib in the above-described exemplary vehicle lamp. In this case, when inserting the rib shallowly into the wiring clip, the force fixing the wiring clip to the rib can be reduced. By contrary, when inserting the rib deeply into the wiring clip, the force fixing the wiring clip to the rib can be increased.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
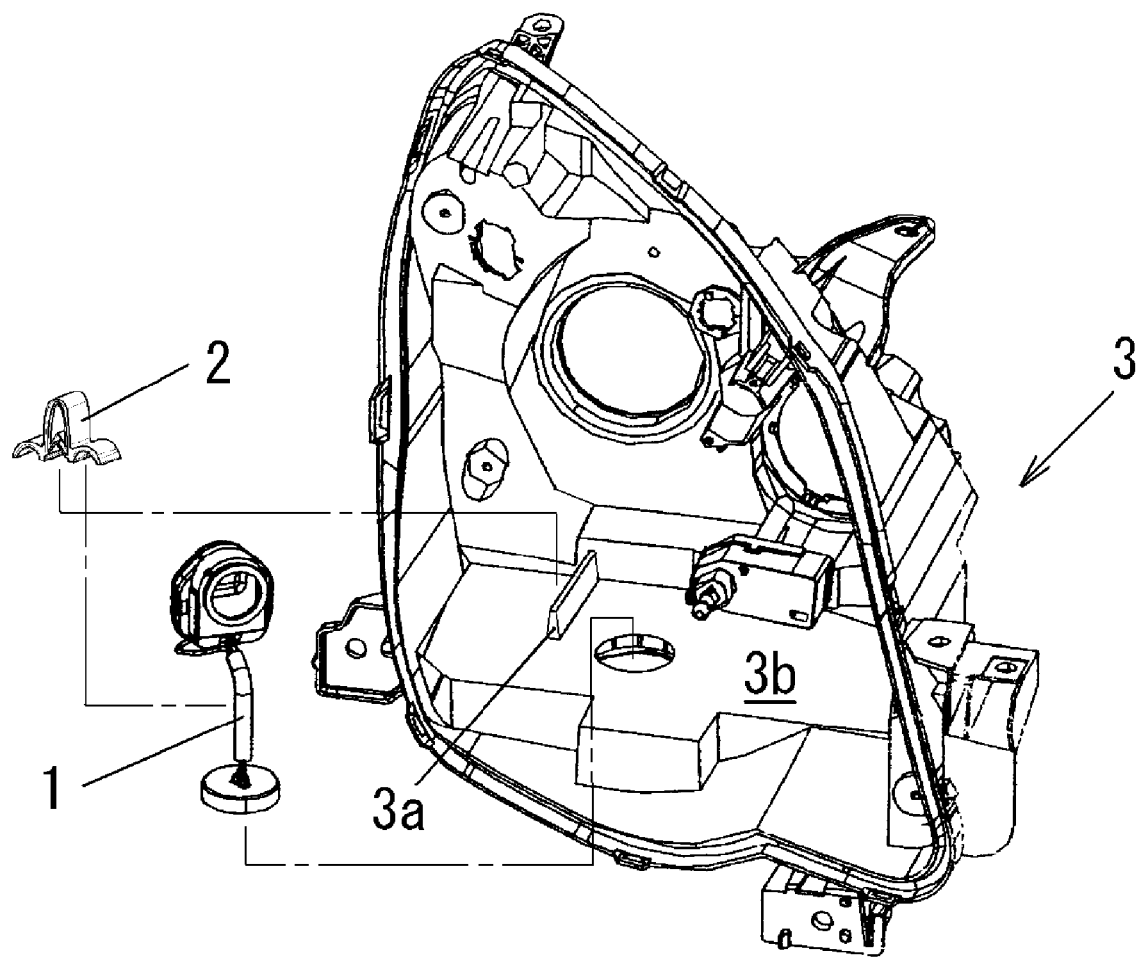
FIG. 1 is a perspective deconstructed view showing components of an exemplary embodiment of a vehicle lamp made in accordance with principles of the disclosed subject matter.

The disclosed subject matter will now be described in detail with reference to FIGS. 1 to 5. FIG. 1 is a perspective deconstructed view showing components of an exemplary embodiment of a vehicle lamp made in accordance with principles of the disclosed subject matter. The vehicle lamp shown in FIG. 1 is a vehicle headlight that includes a wiring harness 1, a wiring clip 2, and a casing 3. The vehicle lamp is not limited to a headlight and can be alternatively configured as a taillight, a positioning light, running light, fog light, traffic light, or other vehicle related lamp device, etc.

The wiring harness 1 can be used, for example, to provide a power supply, a signal from a device, or the like. Therefore, one end of the wiring harness 1 can be configured for connection to a bulb for emitting light, a solenoid for controlling light distribution, a heater for preventing moisture build-up, etc. The other end of the wiring harness 1 can be configured to extend from the casing 3 to an outside area for connection to a power supply, controller, or the like. Consequently, the wiring harness 1 can be fixed in the casing 3 in order to prevent various problems caused by vibration, jolts, etc.

Figure 2A:
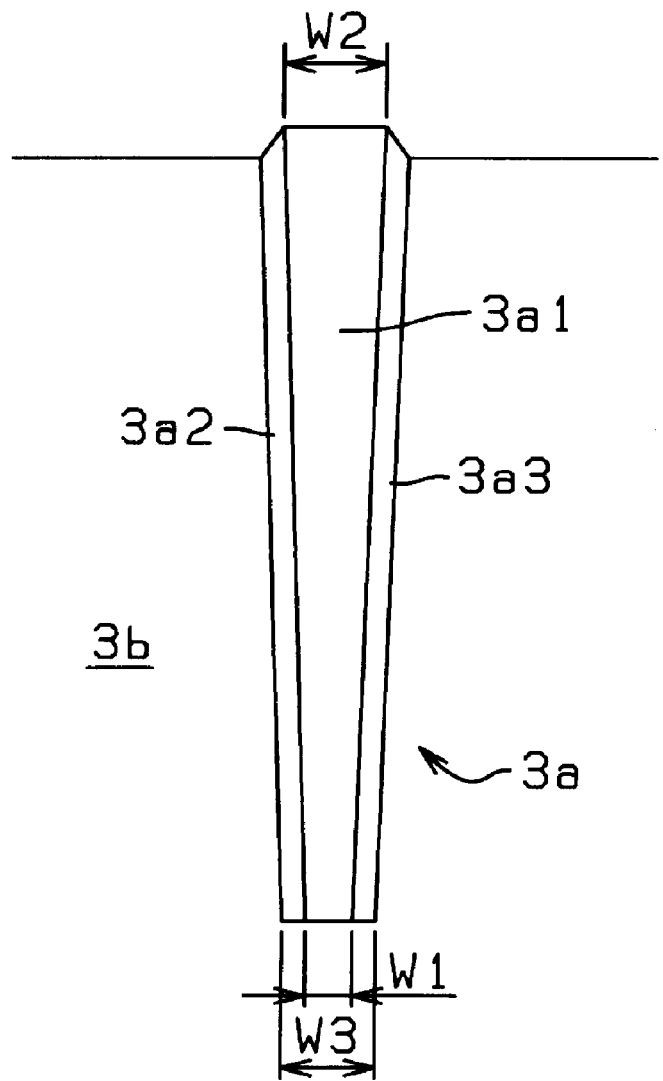
FIGS. 2A, B and C are a top and a front view showing the rib 3a formed in casing 3 of the vehicle lamp of FIG. 1, and a front view of another embodiment of a rib, respectively.

The casing 3 of the vehicle lamp can include a rib 3a and an inner surface 3b. The rib 3a can be fixed to the wiring harness 1 via the wiring clip 2 described later. FIGS. 2A and B are a top and a front view, respectively, of the rib 3a formed in the casing 3 of the vehicle lamp shown in FIG. 1. The rib 3a can be formed on the inner surface 3b of the casing 3 and can include a top surface 3a1, a left side surface 3a2, a right side surface 3a3, and a front side surface 3a4, respectively. The rib 3a can have one top width W1, an other top width W2 (spaced at an opposite end relative to the one top width W1 along a longitudinal axis of the rib 3a), and a bottom width W3 at the same location along the rib 3a as the one top width W1, respectively.

As shown in FIG. 2, the top width of the rib 3a can be continuously tapered from the other top width W2 towards the one top width W1. However, the top width of the rib 3a is not limited to the shape shown in FIG. 2. For example, the top width of the rib 3a can be formed in a step-by step fashion from the other top width W2 towards the one top width W1, can be tapered from the one top width W1 towards the other width W2, and can be also curved from the other top width W2 towards the one width W1.

In addition, the width of the rib 3a can differ in accordance with a position in a direction of a height of the rib 3a. For example, the front width of the rib 3a can be continuously tapered from the one bottom width W3 towards the one top width W1. However, the width of the rib 3a cannot be limited to the shape shown in FIG. 2. For instance, the front width can be increased in a step-by step fashion from the one bottom width W3 towards the one top width W1, can be curved from the one bottom width W3 towards the one top width W1, etc. Furthermore, the front width and a middle width can also differ respectively. The effective usage and shape of the rib 3a will be described in detail later, and can vary depending on the particular application and attachment requirements.

Figure 3A:
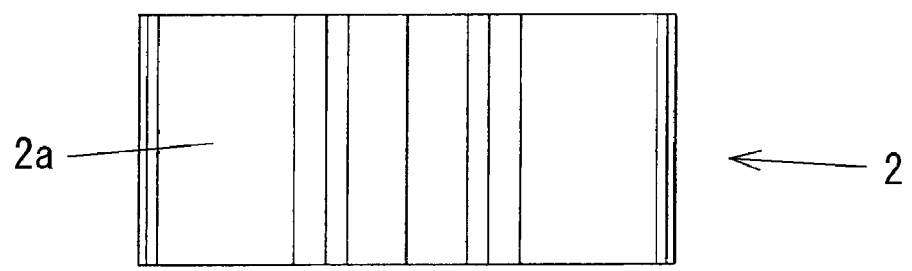
FIGS. 3A and 3B are detail top and front views of a wiring clip 2 for fixing a wiring harness 1 to the rib 3a in the casing 3 of the lamp of FIG. 1.

FIGS. 3A and B a top view and front view, respectively, of the wiring clip 2 of FIG. 1. FIG. 4 is a perspective view showing the wiring clip 2 of FIG. 1. The wiring clip 2 can be composed of both a clip body 2a and a spring clip 2b as shown in FIGS. 3A to 4. The clip body 2a can be composed of a resin and can include a plurality of holder surfaces 2a1 and one wire holder located between adjacent holder surfaces 2a1. A contact surface 2a1a can be provided on the one wire holder and the clip 1 can include a plurality of contact surfaces 2a1a in the clip body 2a.

Figure 3B:
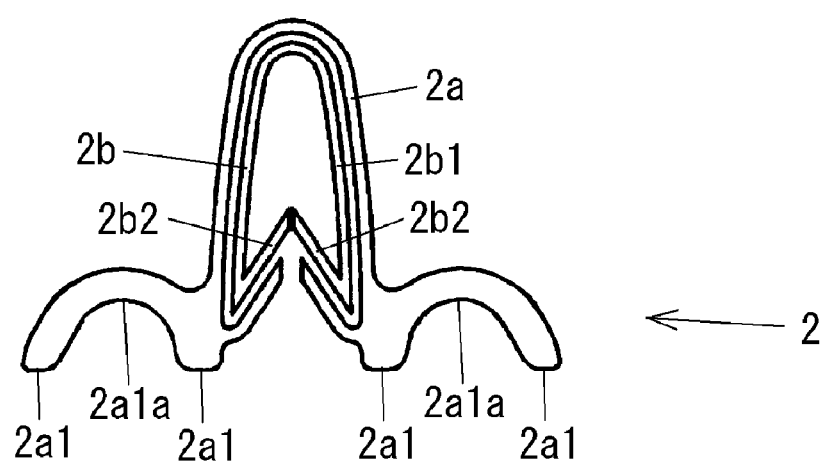
Figure 4:
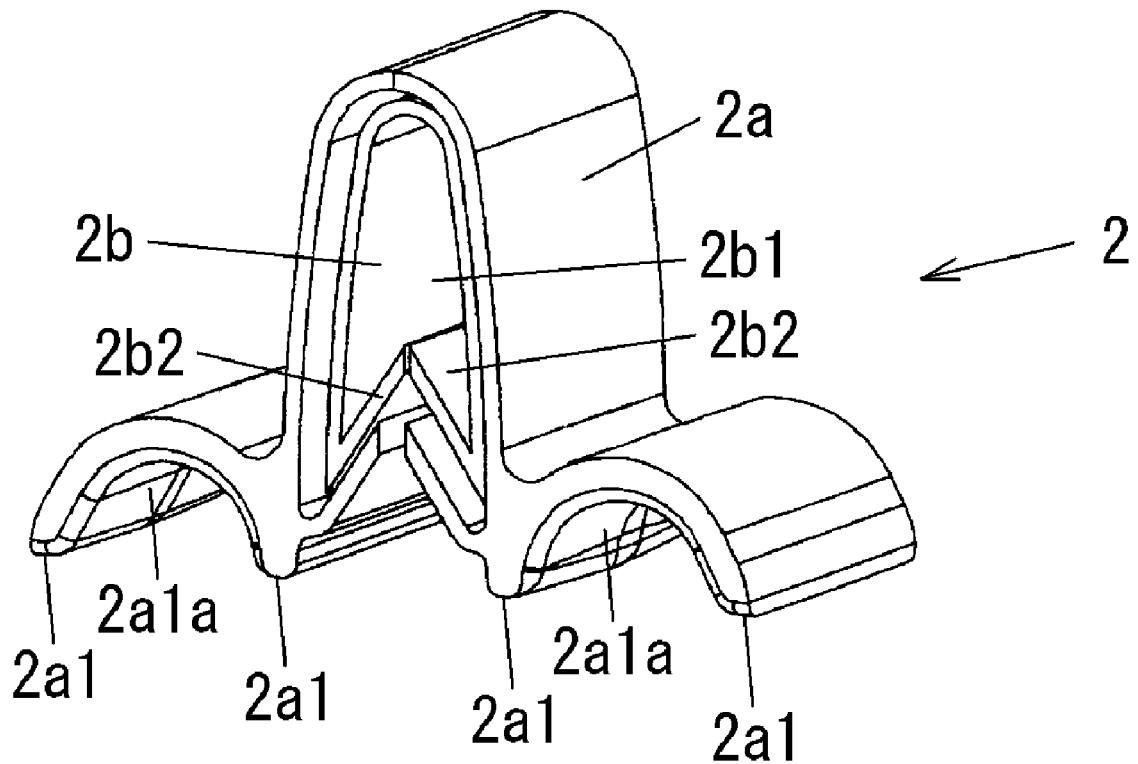
FIG. 4 is a perspective view showing the wiring clip 2 of the lamp of FIG. 1.

The spring clip 2b can be composed of a metal and can include a U-shaped spring 2b1 and at least one locking click 2b2 at either end of the U-shaped spring 2b1 as shown in FIG. 3(B). The spring clip 2b can be inserted in the clip body 2a. Each side of the U-shaped spring 2b1 can be configured to be constantly biased towards each inner side and towards each other, and can be moved towards each outer side by pressing each of the two locking clicks 2b2 in a direction towards a connecting part. Thus, the spring clip 2b can be constantly biased to the closed position because of both biases of the two locking click 2b2, however both ends of the U-shaped spring 2b1 can open when an object is pressed between the two locking clicks 2b2.

When the a wiring harness 1 is fixed to the casing 3 of a vehicle lamp, the wiring harness 1 can be fixed to the above-described the rib 3a in the casing 3 by fixing the wiring clip 2 to the rib 3a while holding the wiring harness 1 with the wire holder. A method for fixing the wiring clip 2 to the rib 3a will now be given in detail.

When the wiring clip 2 is fixed to the rib 3a in the casing 3, the rib 3a can press between the two locking click 2b2 of the spring clip 2b. Because the two locking clicks 2b2 of the spring clip 2b which are constantly biased to the closed position can then open, the rib 3a can be inserted into the spring clip 2b of the wiring clip 2. In this case, the rib 3a can be fixed in the spring clip 2b because of the bias of the U-shaped spring 2b1 of the spring clip 2b. That is to say, the reason why the rib 3a becomes fixed in the spring clip 2b of the wiring clip 2 is that the bias of the U-shaped spring 2b1 causes opposed arm portions to be biased toward each inner side and towards each other. Thus, the wiring clip 2 can be fixed to the casing 3 via the rib 3a without screwing.

When fixing the wiring clip 2 to the rib 3a, the width of the rib 3a that is inserted into the spring clip 2b of the wiring clip 2 can include a difference between the one top width W1 and the other top width W2 as shown in FIG. 2(A). Consequently, when the spring clip 2b is inserted at a position where a width of the rib 3a is narrow, the force fixing the wiring clip 2 to the casing 3 can become weak. By contrast, when the spring clip 2b is inserted at a wide position of the rib 3a, the force fixing the wiring clip 2 to casing 3 can become strong. Thus, the force fixing the wiring clip 2 to the casing 3 can be adjusted and can be voluntarily selected.

Figure 2B:
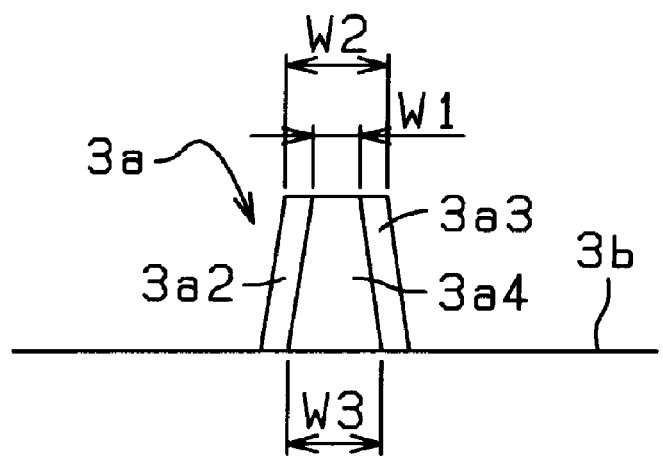
Figure 2C:
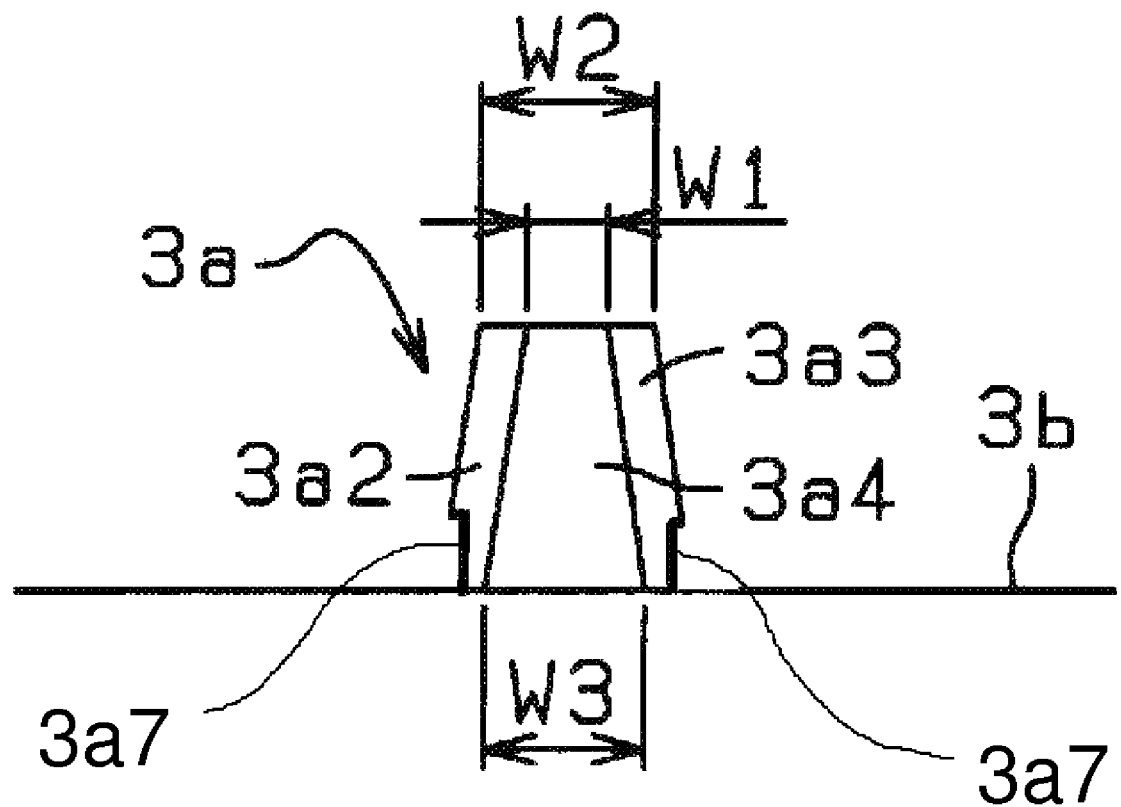

When the width of the rib 3a differs continuously along a row from the one top width W1 towards the other top width W2 as shown in FIG. 2A, the wiring clip 2 can be fixed to a narrow position of the rib 3a that can be easily fixed with a weak force and can then be fixed to a wide position of the rib 3a that can be firmly fixed with a strong force by sliding the wiring clip 2 from the narrow position of the rib 3a to the wide position. As shown in FIG. 2C, the wiring clip 2 can also be fixed to the rib 3a more firmly by providing a groove 3a7 on both side surfaces 3a2, 3a3 for a stopper and inserting both ends of the two locking clicks 2b2 in the grooves 3a7.

In addition, the width of the rib 3a can differ in accordance with a position in a direction towards a height of the rib 3a. The width can differ in a continuous fashion. The height direction is substantially normal to a longitudinal axis of the rib 3a and is also substantially normal to the width of the rib 3a. Thus, as shown in FIG. 2B, the height of the rib 3a can be measured from a location at which the rib 3a connects to the inner surface 3b of the lamp casing to the top of the rib at which width W1 is located. In this case, the width of the rib 3a inserted into the spring clip 2b can differ from W1 at the top portion to a width W3 as shown in FIG. 2(B). Consequently, when the spring clip 2b is inserted and is stopped at a position where a width of the rib 3a is narrow, the force fixing the wiring clip 2 to the casing 3 can be weak. By contrast, when spring clip 2b is inserted and insertion is stopped at a wide position of the rib 3a, the force fixing the wiring clip 2 to casing 3 can be strong. Thus, the force fixing the wiring clip 2 to the casing 3 can be adjusted and be can voluntarily selected by selecting an amount of insertion in a direction of the height of the rib 3a.

Furthermore, when the above-described grooves 3a7 for a stopper are provide at a predetermined position corresponding to a predetermined force for fixing the wiring clip 2 to the casing 3, the wiring clip 2 can firmly fix to the rib 3a in the casing 3 by sliding only in a direction of the height of the rib 3a. Moreover, because the rib 3a is able to have the width as seen by the clip 2 change by combining a variation in insertion direction towards a length thereof with a variation in insertion direction towards a height thereof, various methods for fixing the wiring clip 2 to the casing 3 can be provided according to a number of the wiring harness 1, a diameter, a weight, etc.

Methods for holding the wiring harness 1 with the at least one wiring holder of the wiring clip 2 will now be described in detail. The at least one wiring holder can hold the wiring harness 1 using a tape, a wire, and the like. However, the wiring clip 2 can be configured to hold the wiring harness 1 with the at least one wire holder thereof by fixing the wiring clip 2 to the rib 3a in the casing 3. That is to say, the wiring harness 1 can be sandwiched between a contact surface 2a1a of the at least one wire holder and the inner surface 3b of the casing 3.

Figure 5:
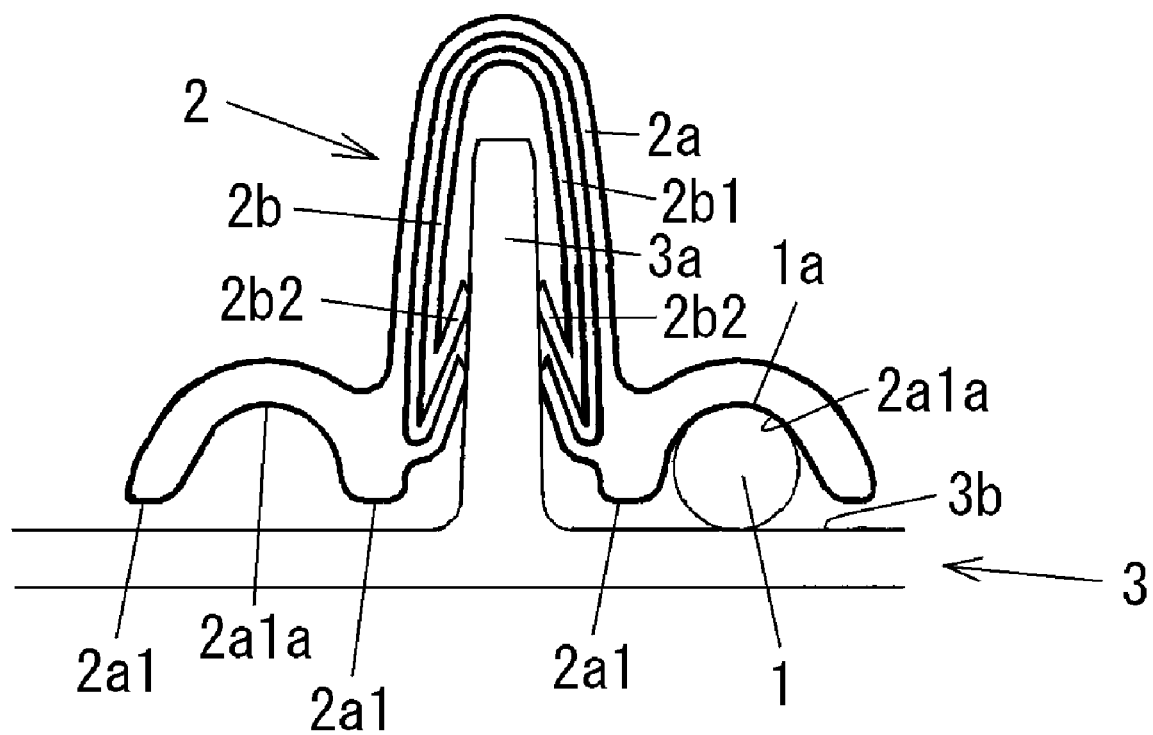
FIG. 5 is a front view showing a state of the wiring harness 1 fixed by the casing and wiring clip 2 in the lamp of FIG. 1.
Figure 6A:
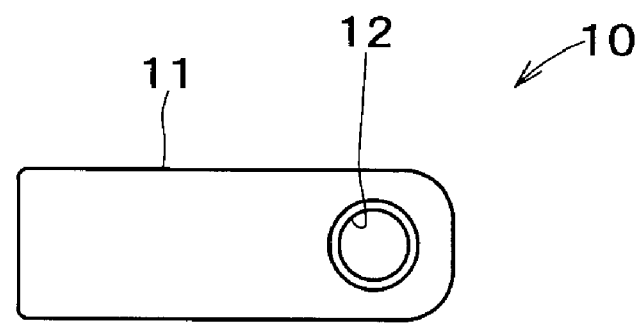
FIGS. 6A and B are a top and front view, respectively, of a first example of a conventional wiring clip.
Figure 6B:
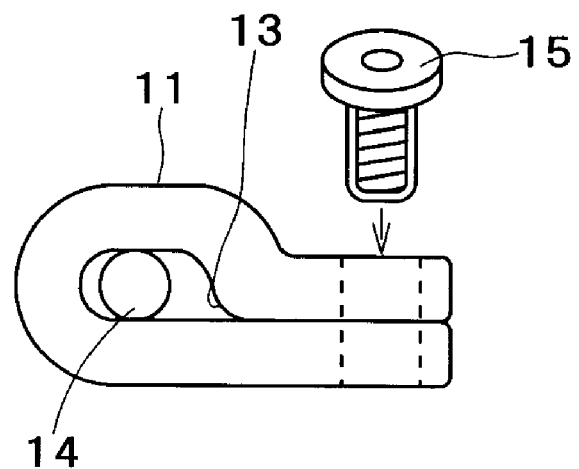
Figure 7A:
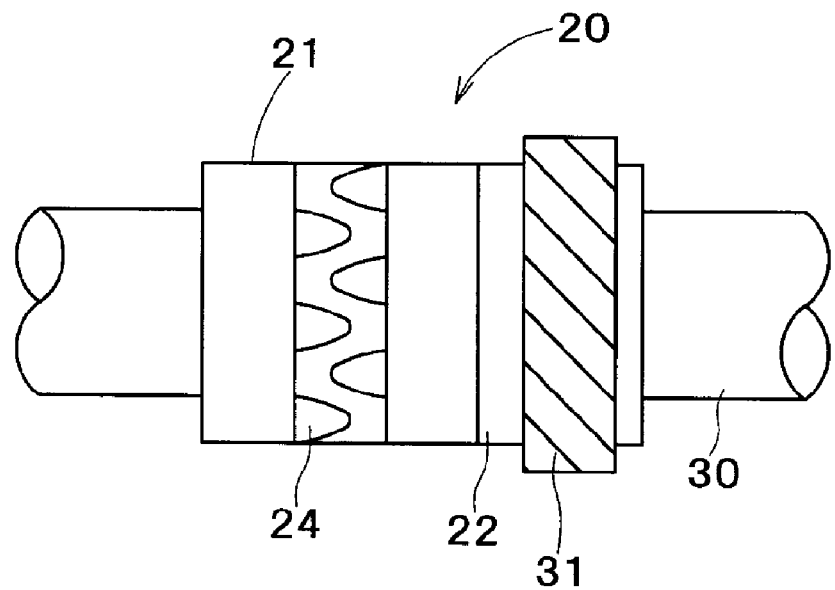
FIGS. 7A and B are a top and front view, respectively, of a second example of a conventional wiring clip.
Figure 7B:
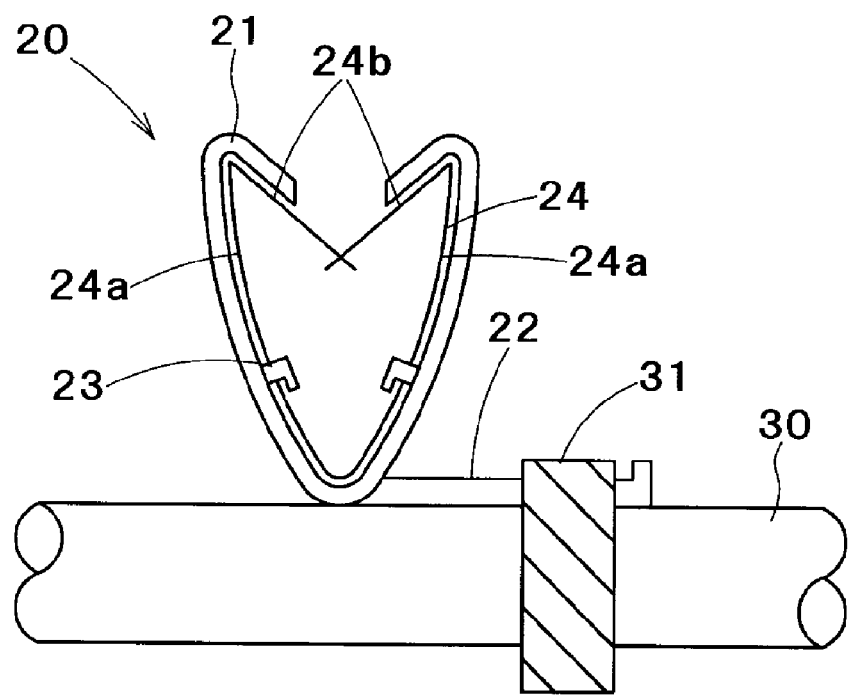

FIG. 5 is a front view of the wiring clip 2 showing a state of the wiring harness 1 being fixed to the casing 3 by the wiring clip 2. The vehicle lamp of the disclosed subject matter can accomplish both tasks of fixing the wiring clip 2 to the rib 3a in the casing 3 and holding the wiring harness 1 with the at least one wire holder of the wiring clip 2 all together. In this case, when an opening width formed by the contact surface 2a1a of the at least one wire holder is wider than a diameter of the wiring harness 1, the wiring harness 1 may fall from the wiring clip 2 when moving the wiring clip 2 holding the wiring harness 1.

Therefore, because the opening width can be form slightly narrower than a diameter of the wiring harness 1 that is inserted from the opening into the at least one wire holder, the wiring harness 1 is prevented from falling out of the wiring clip 2 even when moving the wiring clip 2 while holding the wiring harness 1 with the at least one wire holder. Thus, the vehicle lamp of the disclosed subject matter can allow the wiring clip 2 to be fixed the rib 3a in the casing 3 while holding the wiring harness 1 with the at least one wire holder all together at one time and does not require the above-described processes of screwing the wiring clip 2 with a screw or wrapping the wiring harness 1 using a tape and the like.

A contacting surface 1a of the at least one wire holder of the wiring clip 2 can include a complementary shape with respect to the wiring harness 1 and. In this case, a holding force between the wiring harness 1 and the at least one wire holder can be increased because the wiring harness 1 is prevented from moving relative to the at least one wire holder due to no gap between the structures. Thus, when a plurality of wiring harnesses is held with a plurality of wire holder of the wiring clip 2, each complementary shape can result in an advantage.

The wiring clip 2 shown in FIG. 5 symmetrically provides two wire holders. However, the number of the wire holders and their positions and shapes is not limited to the number shown in this example.

As described above, the vehicle lamp of the disclosed subject matter can include at least one wiring harness, a wiring clip for holding the at least one wiring harnesses with at least one wire holder, and a casing for fixing the wiring clip. The at least one wiring harnesses can be firmly fixed to a rib in the casing via the at least one wire holder of the wiring clip and the force fixing the wiring clip to the rib can be adjusted and can be voluntarily and easily selected. Thus, the vehicle lamp reduces any problems with a wiring associated with receiving vibrations, jolts, etc.

Furthermore, according to the disclosed subject matter, the vehicle lamp can accomplish the processes of both fixing the wiring clip to the rib in the casing and holding at least one wiring harness with at least one wire holder of the wiring clip all together. The processes of both screwing the wiring clip with a screw and wrapping the wiring harnesses using a tape or the like are not necessary. Thus, the disclosed subject matter can provide an excellent vehicle lamp including a wiring harness, a wiring clip and a casing with a simple structure.

Various modifications of the above disclosed embodiments can be made without departing from the spirit and scope of the presently disclosed subject matter. For example there can be a plurality of wire holders located on each side of the spring clip 2b1, or there can be no wire holders on one side of the spring slip 2b1. In addition, the shape of the contact surface 1a of the wire holder can be square, rectangular, non-symmetrical, oval, or even include other further structures that would help retain the wiring harness 1 therein.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle lamp, comprising:
   a wiring harness;
   a wiring clip including both a clip body having at least one wire holder and a spring clip having at least two locking clicks, the spring clip located in the clip body, and the at least one wire holder of the clip body being configured to hold the wiring harness therein; and
   a casing including a rib that is located in between the at least two locking clicks of the spring clip when the wiring clip is attached to the casing, wherein the rib has a length extending along a longitudinal axis of the rib and a width extending substantially normal to the longitudinal axis of the rib, and wherein the width of the rib differs in accordance with a position along the length of the rib.

2. The vehicle lamp according to claim 1, wherein the width of the rib continuously differs along the longitudinal axis of the rib.

3. The vehicle lamp according to claim 1, wherein the wiring harness is sandwiched between a contact surface of the at least one wire holder and an inner surface of the casing.

4. The vehicle lamp according to claim 2, wherein the wiring harness is sandwiched between a contact surface of the at least one wire holder and an inner surface of the casing.

5. The vehicle lamp according to claim 1, wherein the at least one wire holder includes a first side contact surface located on a first side of the clip body and a second side contact surface located on a second opposite side of the clip body, and wherein the wiring harness is sandwiched between both side contact surfaces of the at least one wire holder and the casing.

6. The vehicle lamp according to claim 2, wherein the at least one wire holder includes a first side contact surface located on a first side of the clip body and a second side contact surface located on a second opposite side of the clip body, and wherein the wiring harness is sandwiched between both side contact surfaces of the at least one wire holder and the casing.

7. The vehicle lamp according to claim 3, wherein a contacting surface of the at least one wire holder has a shape that is substantially identical to a shape of a contacting surface of the wiring harness.

8. The vehicle lamp according to claim 4, wherein a contacting surface of the at least one wire holder has a shape that is substantially identical to a shape of a contacting surface of the wiring harness.

9. The vehicle lamp according to claim 5, wherein a contacting surface of the at least one wire holder has a shape that is substantially identical to a shape of a contacting surface of the wiring harness.

10. The vehicle lamp according to claim 6, wherein a contacting surface of the at least one wire holder has a shape that is substantially identical to a shape of a contacting surface of the wiring harness.

11. The vehicle lamp according to claim 1, wherein the rib has a height extending substantially normal to the length of the rib and substantially normal to the width of the rib, and the width of the rib differs in accordance with a position along the height of the rib.

12. The vehicle lamp according to claim 2, wherein the rib has a height extending substantially normal to the length of the rib and substantially normal to the width of the rib, and the width of the rib differs in accordance with a position along the height of the rib.

13. The vehicle lamp according to claim 3, wherein the rib has a height extending substantially normal to the length of the rib and substantially normal to the width of the rib, and the width of the rib differs in accordance with a position along the height of the rib.

14. The vehicle lamp according to claim 4, wherein the rib has a height extending substantially normal to the length of the rib and substantially normal to the width of the rib, and the width of the rib differs in accordance with a position along the height of the rib.

15. The vehicle lamp according to claim 5, wherein the rib has a height extending substantially normal to the length of the rib and substantially normal to the width of the rib, and the width of the rib differs in accordance with a position along the height of the rib.

16. The vehicle lamp according to claim 6, wherein the rib has a height extending substantially normal to the length of the rib and substantially normal to the width of the rib, and the width of the rib differs in accordance with a position along the height of the rib.

17. The vehicle lamp according to claim 7, wherein the rib has a height extending substantially normal to the length of the rib and substantially normal to the width of the rib, and the width of the rib differs in accordance with a position along the height of the rib.

18. The vehicle lamp according to claim 8, wherein the rib has a height extending substantially normal to the length of the rib and substantially normal to the width of the rib, and the width of the rib differs in accordance with a position along the height of the rib.

19. The vehicle lamp according to claim 9, wherein the rib has a height extending substantially normal to the length of the rib and substantially normal to the width of the rib, and the width of the rib differs in accordance with a position along the height of the rib.

20. The vehicle lamp according to claim 10, wherein the rib has a height extending substantially normal to the length of the rib and substantially normal to the width of the rib, and the width of the rib differs in accordance with a position along the height of the rib.

21. The vehicle lamp according to claim 1, wherein the rib includes at least one groove extending along the length of the rib, and at least one of the two clicks is located in the at least one groove when the wiring clip is attached to the rib.

* * * * *